(12) United States Patent
Paukkunen

(10) Patent No.: US 7,509,838 B2
(45) Date of Patent: Mar. 31, 2009

(54) CORRECTION OF HUMIDITY MEASUREMENT RESULTS OF A RADIOSONDE

(75) Inventor: Ari Paukkunen, Vantaa (FI)

(73) Assignee: Vaisala Oyj, Vantaa (FI)

( * ) Notice: Subject to any disclaimer, the term of this patent is extended or adjusted under 35 U.S.C. 154(b) by 42 days.

(21) Appl. No.: 10/579,676

(22) PCT Filed: Nov. 17, 2004

(86) PCT No.: PCT/FI2004/000691

§ 371 (c)(1),
(2), (4) Date: Sep. 18, 2007

(87) PCT Pub. No.: WO2005/050259

PCT Pub. Date: Jun. 2, 2005

(65) Prior Publication Data

US 2008/0072669 A1    Mar. 27, 2008

(30) Foreign Application Priority Data

Nov. 18, 2003    (FI)    ................................. 20031672

(51) Int. Cl.
*G01N 19/10* (2006.01)
(52) U.S. Cl. .................. 73/29.01; 73/29.05; 73/335.04; 702/99; 702/104
(58) Field of Classification Search .................. 73/1.02, 73/29.01, 29.02, 29.05, 1.05, 335.02, 335.04, 73/335.05; 702/99, 104
See application file for complete search history.

(56) References Cited

U.S. PATENT DOCUMENTS

| 4,481,514 | A | * | 11/1984 | Beukers et al. ........... 340/870.1 |
| 4,893,508 | A | | 1/1990 | Friedman |
| 5,156,045 | A | | 10/1992 | Ponkala |
| 5,365,784 | A | * | 11/1994 | Morrissey ................. 73/335.02 |
| 5,511,417 | A | | 4/1996 | Paukkunen |
| 6,073,480 | A | * | 6/2000 | Gokhfeld .................... 73/29.02 |
| 6,257,049 | B1 | | 7/2001 | Greybush |
| 7,077,004 | B2 | * | 7/2006 | Mitter ...................... 73/335.04 |
| 2002/0040598 | A1 | * | 4/2002 | Sugaya et al. ............. 73/335.02 |

FOREIGN PATENT DOCUMENTS

FI    85770 A    8/1991

(Continued)

OTHER PUBLICATIONS

Junhong Wang et al.; Corrections of Humidity Measurement Errors from the Vaisala RS80 Radiosonde—Application to TOGA COARE Data; Journal of Atmospheric and Oceanic Technology; Jul. 2002; vol. 19; pp. 981-1001.

(Continued)

*Primary Examiner*—David A. Rogers
(74) *Attorney, Agent, or Firm*—Venable LLP; Eric J. Franklin

(57) ABSTRACT

A method for correcting humidity measurement results of a radiosonde, especially for errors resulting from radiative heat exchange. Environmental humidity $U_m$ is measured with a humidity sensor in the radiosonde, a current value of at least one environmental condition parameter is determined, and error-corrected humidity U is calculated directly or indirectly utilizing the measured environmental humidity $U_m$ and a correction value corresponding to the at least one current environmental condition parameter value.

12 Claims, 2 Drawing Sheets

FOREIGN PATENT DOCUMENTS

| | | | |
|---|---|---|---|
| FI | | 95626 A | 3/1995 |
| JP | 2000275355 A | | 10/2000 |

OTHER PUBLICATIONS

D.D. Turner et al.; Dry Bias and Variability in Vaisala RS80-H Radiosondes: The ARM Experience; American Meteorological Society; Jan. 2003; pp. 117-131.

B.M. Lesht and S.J. Richardson; The Vaisala RS-80H Radiosonde Dry-Bias Correction Redux; Apr. 2002; pp. 1-6.

James K. Luers; Temperature Error of the Vaisala RS90 Radiosonde; Journal of Atmospheric and Oceanic Technology; 1997; vol. 14; pp. 1520-1532.

\* cited by examiner

| h\P | 1000 | 500 | 100 | 3 |
|---|---|---|---|---|
| -7 | 0 | . | 0 | -0,5 |
| 0 | 0 | . | . | . |
| . | . | . | . | . |
| . | . | . | . | . |
| 90 | 0 | . | +3 | +10 |

20

CORRECTION OF HUMIDITY MEASUREMENT RESULTS OF A RADIOSONDE

CROSS-REFERENCE TO RELATED APPLICATIONS

This application claims priority to Finnish patent application 20031672 filed 18 Nov. 2003 and is the national phase under 35 U.S.C. § 371 of PCT/FI2004/000691.

FIELD OF THE INVENTION

The invention relates to correcting humidity measurement results of a radiosonde.

BACKGROUND OF THE INVENTION

A radiosonde is a measuring device, which is used in measurements of climatic conditions. The radiosonde may be carried upwards from ground surface through layers of air with a special gas balloon, whereby the atmosphere to be measured and also the environmental conditions of the measurement arrangement change dynamically. Meteorological measurements are performed with measuring devices in the radiosonde, in which case variables to be measured are generally temperature, humidity, pressure and wind (and/or location). Determining the location of the radiosonde may be based on, for example, the GPS (Global Positioning System) or Loran network methods, and furthermore, the velocity and direction of the wind may be deducted on the basis of changes in location information. The measuring data of measuring devices are communicated with a radio transmitter in the radiosonde via a radio receiver on the ground to ground equipment for further processing. The analysing of measurement results is performed, for example, by means of a suitable computer software/algorithm on the ground surface or in the radiosonde.

The environmental conditions of radiosonde measurements are demanding: the measurements are complicated by, inter alia, large scale of measured variable, rain, humidity, freezing, condensation and oversaturation. Measuring errors are caused also by slowness of radiosonde measurement sensors (time delay) and radiative heat exchange occurring in the atmosphere, such as solar radiation and, at night, infrared radiation (IR).

In order to improve the accuracy of temperature measurements performed with the radiosonde, methods have been developed to eliminate errors from the temperature measurement results caused by, inter alia, time delay and radiative heat exchange.

Humidity measurement is more demanding already as such and because humidity measuring is also dependent on temperature in addition to the above mentioned error factors. Humidity measurement is calibrated to the humidity and temperature range used, whereby the measurement includes a correction of temperature dependency (the sensor and measured air are in the same temperature). However, known corrections of humidity measuring do not include a correction of humidity measurement results of the radiosonde in relation to errors especially resulting from radiative heat exchange directly or indirectly.

Recent development in forecast and research of changes in climatic conditions and of traditional weather forecast have set even more strict accuracy requirements for humidity measurement results, especially in the upper troposphere and stratosphere in which low temperatures combined with low water vapour concentration (stratosphere) or high water vapour content (upper troposphere) make the measuring environment extremely challenging. Humidity also varies quickly in relation to time and location. The accuracy of humidity measurements is an important quality factor in weather forecasting. Also in understanding the greenhouse effect and forecasting the changes in atmosphere, humidity measurement is an essential factor.

Typically, the humidity measurement results produced by different radiosondes have not been, as such, accurate enough for, for example, exact research and forecast related to climatic conditions. Thus, it is necessary to improve the accuracy of humidity measurement results.

SUMMARY OF THE INVENTION

One object of the present invention is to provide a method for correcting the humidity measurement results of the radiosonde, and especially for correcting the humidity measuring errors resulting either directly or indirectly from radiative heat exchange. Typically, the radiative heat exchange causes humidity measurement errors directly or indirectly from short-wave solar radiation or from long-wave thermal radiation of an object (IR).

A basic idea of the invention is to determine in connection with humidity measurement at least one current value of a so-called environmental conditions parameter and to correct the humidity measurement result by means of said current environmental conditions parameter value. Furthermore, a basic idea of some embodiments of the invention is to correct the humidity reading measured with a humidity sensor calculatorily and/or by means of correction values saved to a suitable data structure.

According to a first aspect of the invention, a method is implemented for correcting humidity measurement results of a radiosonde in respect to errors resulting from radiative heat exchange, the radiosonde comprising at least a humidity sensor, the method comprising forming beforehand a data structure, which comprises correction values of humidity measurement results in different environmental conditions, environmental conditions being determined in said data structure as a function of at least one environmental conditions parameter, or determining beforehand a mathematical function, by means of which one is able to calculate a correction value for humidity measurement result corresponding at least one current environmental conditions parameter value, said environmental conditions parameter being a variable having an effect in the environment of the humidity sensor and said correction values being determined so that they correct errors resulting from radiative heat exchange, measuring environmental humidity $U_m$ with said humidity sensor, determining current value of at least one environmental conditions parameter value, and calculating error-corrected humidity U directly or indirectly by means of said measured environmental humidity $U_m$ and a correction value corresponding said at least one current environmental conditions parameter value in said data structure or a correction value calculated with said mathematical function.

The measured humidity reading $U_m$ may be already corrected and calibrated in relation to one or more different factors.

In this context a variable having an effect in the environment of the humidity sensor means conditions "outside" the humidity sensor. The above-mentioned environmental conditions parameter may relate to, for example, some variable affecting humidity measurement result, such as pressure, environmental temperature, humidity, location altitude of the radiosonde, sounding time of the radiosonde, intensity of solar radiation, solar elevation angle, location of the radiosonde on the globe, or the ascending speed of the radiosonde.

The correction value of humidity measurement results may be based on or depend on, for example, some variable affecting humidity, such as pressure, environmental temperature, humidity, location altitude of the radiosonde, sounding time of the radiosonde, intensity of solar radiation, solar elevation angle, location of the radiosonde on the globe, or the ascending speed of the radiosonde. The correction values may be determined, for example, as a function of air pressure P and solar elevation angle h or as a function of saturation humidity dependent on temperature (% rh) and of air pressure P.

According to an embodiment of the invention, said correction values are the correction values of saturation humidity level $\Delta$rh, and error-corrected humidity U is calculated by means of $\Delta U_{rh}$ corresponding at least one current environmental conditions parameter value and of measured environmental humidity $U_m$. According to an alternative embodiment, said correction values may directly be humidity level corrections values $\Delta U$ in which case error-corrected humidity U is calculated by means of $\Delta U$ corresponding said at least one current environmental conditions parameter value and of measured environmental humidity $U_m$.

According to a further embodiment of the invention, said correction values are differences $\Delta T_U$ between environmental temperature and humidity sensor temperature, said radiosonde comprising also a temperature sensor, and the method comprising the steps of measuring environmental temperature $T_T$ with said temperature sensor, calculating humidity sensor temperature $T_U$ by means of $\Delta T_U$ corresponding said at least one current environmental conditions parameter value and of said environmental temperature $T_T$, and calculating error-corrected humidity U by means of calculated humidity sensor temperature $T_U$, environmental temperature $T_T$ and measured environmental humidity $U_m$.

Advantageously, error correction/corrections is/are performed for environmental temperature $T_T$, and the error-corrected environmental temperature $T_T$ is used in calculating humidity sensor temperature $T_U$ and error-corrected humidity U.

The above-mentioned data structure may be formed, for example, by performing suitable comparison measurements. Comparison measurements may be performed, for example, with dew point or radar measurements. Correction values of the data structure being differences between environmental temperature and humidity sensor temperature $\Delta T_U$, comparison measurements may simply be measurements relating to the temperatures of environment and humidity sensor in different environmental conditions. The differences $\Delta T_U$ between environmental temperature and humidity sensor temperature of said data structure may be determined, for example, as a function of air pressure P and solar elevation angle h, but also any other suitable method of determination may be used. The data structure may be, for example, a table, a list, a vector or other suitable data structure.

According to a second aspect of the invention, a data processing device is implemented for correcting humidity measurement results of a radiosonde in respect to errors resulting from radiative heat exchange, the radiosonde comprising at least a humidity sensor, the data processing device comprising a beforehand formed data structure which comprises correction values of humidity measurement results in different environmental conditions, the environmental conditions being determined in said data structure as a function of said at least one environmental conditions parameter, or a memory comprising a beforehand determined mathematical function by means of which one may calculate a correction value of humidity measurement result corresponding at least one current environmental conditions parameter value, said environmental conditions parameter being a variable having an effect in the environment of the humidity sensor and said correction values being determined so that they correct errors resulting from radiative heat exchange, receiving means for receiving humidity $U_m$ measured with said humidity sensor and receiving at least one current environmental conditions parameter value, and calculation means for calculating error-corrected humidity U directly or indirectly by means of said measured environmental humidity $U_m$ and a correction value corresponding the value of said at least one environmental conditions parameter in said data structure or a correction value calculated with said mathematical function.

A data processing device according to the invention may be, for example, any suitable apparatus, such as a general-purpose computer, processor or server. The data processing device in question may also be fully or partly located in the radiosonde.

According to a third aspect of the invention, a computer program is implemented which program provides a routine for correcting humidity measurement results of a radiosonde in respect to errors resulting from radiative heat exchange when said computer program is run, the radiosonde comprising at least a humidity sensor, and said computer program communicating with a beforehand formed data structure which comprises correction values of humidity measurement results in different environmental conditions, the environmental conditions being determined in said data structure as a function of at least one environmental conditions parameter, or a memory which comprises a beforehand determined mathematical function by means of which one may calculate a correction value corresponding at least one current environmental conditions parameter value, said environmental conditions parameter being a variable having an effect in the environment of the humidity sensor and said correction values being determined so that they correct errors resulting from radiative heat exchange, said computer program comprising a program code for receiving humidity $U_m$ measured with said humidity sensor and receiving at least one current environmental conditions parameter value, and a program code for calculating error-corrected humidity U directly or indirectly by means of said measured environmental humidity $U_m$ and a correction value corresponding the value of said at least one environmental conditions parameter in said data structure or a correction value calculated with said mathematical function.

The computer program according to the invention may be implemented, for example, as a computer program product saved on suitable storage medium or as a software integrated to a suitable data processing equipment or a radiosonde.

BRIEF DESCRIPTION OF THE DRAWINGS

The invention will now be described in detail by way of examples with reference to the accompanying figures, in which.

DETAILED DESCRIPTION OF EMBODIMENTS OF THE INVENTION

Figure 1:
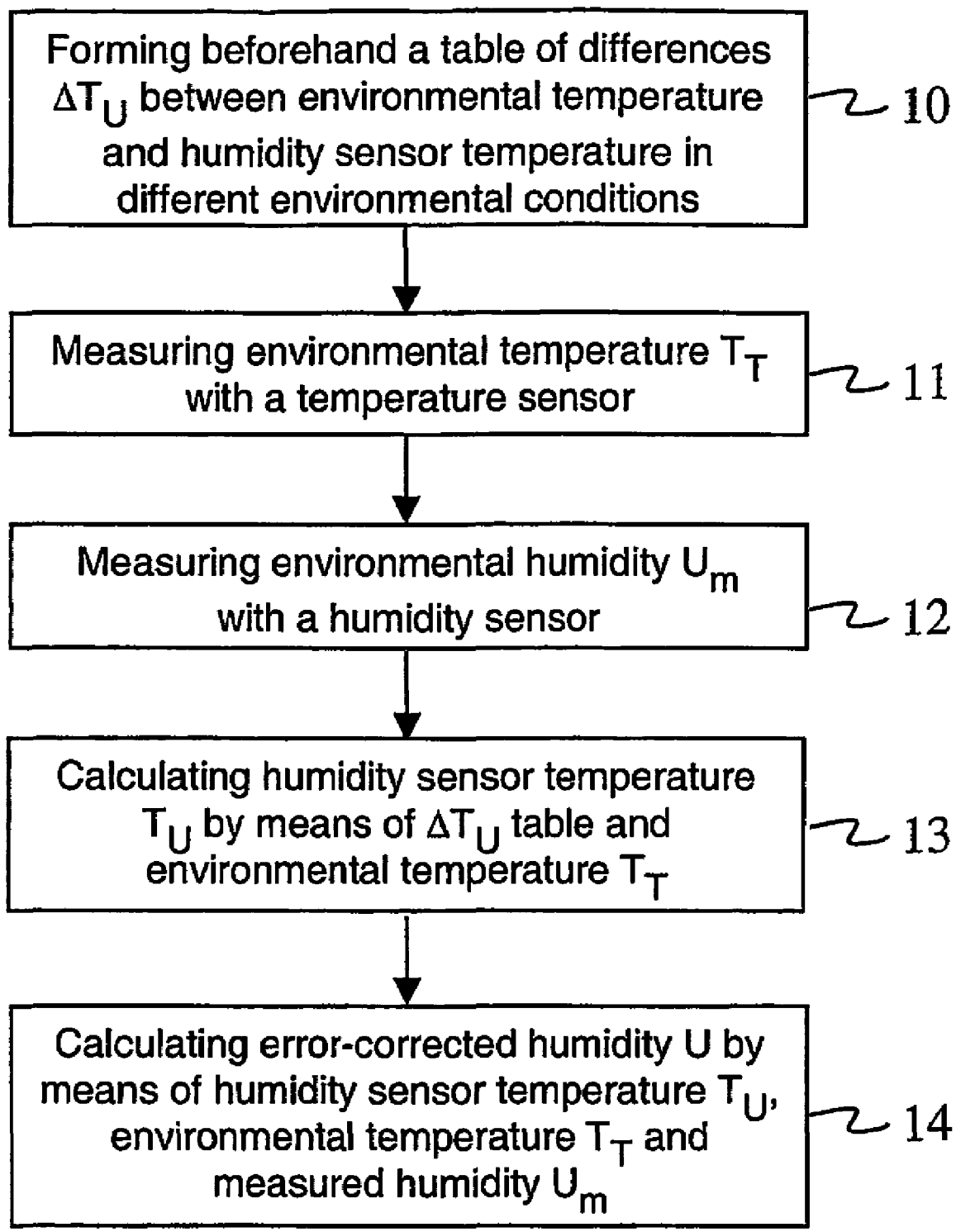
FIG. 1 is a flow diagram illustrating a method according to an embodiment of the invention.

On general level, in the method according to an embodiment of the invention, one performs a so-called normal humidity measurement with a humidity sensor included in a radiosonde for acquiring measured value $U_m$ for environmental humidity. In the same context, one determines the current value of at least one environmental conditions parameter. Then, with this value of measured environmental humidity $U_m$ and this current value of environmental conditions parameter (or parameters), one calculates directly or indirectly the error-corrected humidity U.

The environmental conditions parameter may be based on, for example, some variable affecting humidity measurement result, such as pressure, environmental temperature, humidity, location altitude of the radiosonde, sounding time of the radiosonde, intensity of solar radiation, solar elevation angle, location of the radiosonde on the globe, or the ascending speed of the radiosonde.

Determining a value of environmental conditions parameter may be performed directly or indirectly with, for example, a second measurement sensor included in the radiosonde or the environmental conditions parameter value may be obtained from a source independent from the radiosonde. For example, solar elevation angle, which may be used as an environmental conditions parameter, is dependent on date and time and is thus a variable independent from the radiosonde and measurements performed in it.

The current value of environmental conditions parameter (or parameters) may thus be used directly to calculate the error-corrected humidity. For example, a suitable function or formula dependent on the environmental conditions parameter value and measured humidity reading may be used for this purpose. Alternatively, the current value of environmental conditions parameter may be utilised indirectly. Calculation indirectly by means of an environmental conditions parameter means here that one may calculate an intermediate result by means of the environmental conditions parameter value or one may identify a value of some additional parameter or factor or a suitable arithmetic function.

In a solution according to an embodiment of the invention, a data structure is formed beforehand which data structure comprises correction values of humidity measurement results in different environmental conditions, the environmental conditions being determined in said data structure as a function of said at least one environmental conditions parameter, and the error-corrected humidity U is calculated directly or indirectly by means of said measured environmental humidity $U_m$ and a correction value corresponding at least one current environmental conditions parameter value in said data structure. Said correction value may be, for example, a correction factor, whereby the actual value is calculated with multiplication, or a difference (correction) between the corrected value and actual value, whereby the actual value is calculated with summation. The particulars of this embodiment are discussed in detail later in this specification.

In another embodiment of the invention, a suitable mathematical function is used instead of the above-mentioned data structure. Then, the correction value of humidity measurement result corresponding said at least one current environmental conditions parameter value is calculated with a certain mathematical function, and the error-corrected humidity U is calculated directly or indirectly by means of said measured environmental humidity $U_m$ and said calculated correction value.

An embodiment of the invention is mainly based on analysing and correcting errors caused by radiative heat exchange by means of the temperature difference $\Delta T_U$ between humidity sensor and the environment. The actual humidity U is a function of humidity sensor temperature $T_U$ and humidity $U_m$ measured by the sensor:

$$U = f(T_U, U_m)$$

In known prior-art solutions, it is typically assumed that the environmental temperature and humidity sensor temperature correspond each other. Now it has been noticed that this essentially causes errors on humidity measurement results, because there might be considerable differences between the humidity sensor temperature and environmental temperature caused by, inter alia, the effect of radiative heat exchange occurring as the effect of measuring environment. In the present invention, the difference between the humidity sensor temperature and environmental temperature has been considered in analysing and correcting humidity measurement results.

FIG. 1 is a flow diagram illustrating a method according to an embodiment of the invention for correcting humidity measurement results of a radiosonde.

In step 10, a table is formed beforehand of the differences $\Delta T_U$ between environmental temperature and humidity sensor temperature (correction values of $T_U$ in relation to the environmental temperature) in different environmental conditions. The contents of this kind of table are discussed in more detail below in context with FIG. 2.

In step 11, environmental temperature $T_T$ is measured with the temperature sensor of the radiosonde. Measured environmental temperature $T_T$ is corrected advantageously in this context in terms of different error factors, such as radiative heat exchange and/or time delay. The radiative heat exchange correction of temperature measurements is dealt with in, for example, the article James K. Luers, "Temperature Error of Vaisala RS90 Radiosonde" in Journal of Atmospheric and Oceanic Technology, Vol. 14, Nro 6, December 1997, pp. 1520-1532. In practice, the measured environmental temperature $T_T$ is corrected to equal the actual environmental temperature as accurately as possible. One may also use a measurement result with no error correction but, in that case, the errors of temperature measuring are repeated in the error correction of humidity measuring. Next, environmental humidity $U_m$ is measured with the humidity sensor in step 12. The measured humidity $U_m$ is thus a so-called normal measurement result obtained with the humidity sensor.

In step 13, the temperature $T_U$ of humidity sensor is calculated beforehand by means of the table formed in step 10 and environmental temperature $T_T$. (Here one may use the error-corrected value of $T_T$ for achieving more accurate end results.) From the table, one looks for the $\Delta T_U$ value, which corresponds the environmental conditions that prevailed when performing humidity measuring (measurement of $U_m$), and this value is used for calculating $T_U$.

The humidity sensor temperature $T_U$ may be calculated, for example, in the following way:

$$T_U = T_T + k_U T_U,$$

in which $T_T$=environmental temperature advantageously error-corrected,
$k_U$=ventilation factor in relation to a nominal value, and
$\Delta T_U$=difference between environmental temperature and humidity sensor temperature (correction in relation to the environmental temperature) in current (nominal $k_U$) environmental conditions.

If required, the value of $\Delta T_U$ in question may be corrected, in addition to $k_U$, also in relation with other affecting thermodynamic factors.

The ventilation factor $k_U$ expresses the change in the heat-transfer factor between air and sensor when ventilation changes. The tabulated (nominal) value of $\Delta T_U$ corresponds a certain (nominal) ventilation value, and the ventilation factor is thus expressed as a change of ventilation factor between the actual and nominal situations. Its determination may be performed through a thermodynamic analysis of the heat-transfer situation in question using different approximations and utilising experimental measuring, for example, in the following way:

$$k_U = a \cdot \left(\frac{v}{v_0}\right)^b,$$

in which
v=actual ascending speed of the radiosonde,
$v_0$=nominal ascending speed of the radiosonde which speed is typically 5-6 m/s,
a=constant (for example in the order of 1), and
b=constant (for example of the order of –0.5 depending on the features of used sensor).

The actual ascending speed of the radiosonde may be determined in a certain period, for example, so that the altitude of the radiosonde is calculated at a certain point of time on the basis of air pressure P, temperature T and humidity U, whereby the ascending speed is the change of altitude between different points of time divided with the time difference between the points of time in question. For the table, a nominal radiosonde ascending speed has been decided on, which speed corresponds ventilation speed when the sonde is carried with an air flow, based on a conception of an advantageous average ascending speed from the point of view of measurement.

The ventilation factor $k_U$ may also be determined in the following way (based on a certain other suitable approximation of heat-transfer situation):

$$k_U = f\left(P, \frac{dt}{dP}\right),$$

in which
P=air pressure, and
t=time.

Also other suitable ways may be used in determining the ventilation factor $k_U$. For example, one may take into consideration in the ventilation factor that the thermodynamics and heat exchange of a plate-like (humidity sensor) and cylindrical (temperature sensor) object are different, whereby the ventilation factor $k_U$ of humidity measuring in typically different from the ventilation factor $k_T$ of temperature measuring.

After this, in the flow chart according to FIG. 1, one calculates in step 14 the error-corrected humidity U by means of the humidity sensor temperature $T_U$ determined in step 13, environmental temperature $T_T$ and measured humidity $U_m$. (Also here one may advantageously use the error-corrected value of $T_T$.) The error-corrected humidity may be calculated, for example, in the following way:

Relative humidity U in temperature T is determined by $$U = \frac{e}{e_w(T)} \cdot 100,$$

in which
$e_w(T)$=partial pressure of saturated water vapour (saturation vapour pressure) in temperature T, and
e=actual vapour pressure in temperature T.

According to the definition, measured humidity is $$U_m = \frac{e}{e_w(T_U)} \cdot 100$$

From this, one may calculate the actual vapour pressure e, and by substituting the above-calculated e to the formula according to the basic definition, one obtains the error-corrected actual humidity U:

$$U = \frac{e}{e_w(T_T)} \cdot 100 = \frac{e_w(T_U)}{e_w(T_T)} \cdot U_m,$$

in which
$T_T$=environmental temperature measured with temperature sensor advantageously error-corrected,
$T_U$=humidity sensor temperature,
$U_m$=measured humidity,
$e_w(T_U)$=partial pressure of saturated water vapour in temperature $T_U$,
$e_w(T_T)$=partial pressure of saturated water vapour in temperature $T_T$, and
$e(T_T)$=actual vapour pressure in temperature $T_T$.

The partial pressure of saturated water vapour $e_w$ may be determined, for example, by means of Wexler-Hyland approximation widely known in the field of meteorology. However, it is evident to a man skilled in the art that also other approximations may be used within the scope of the invention.

Figures 2, 3:
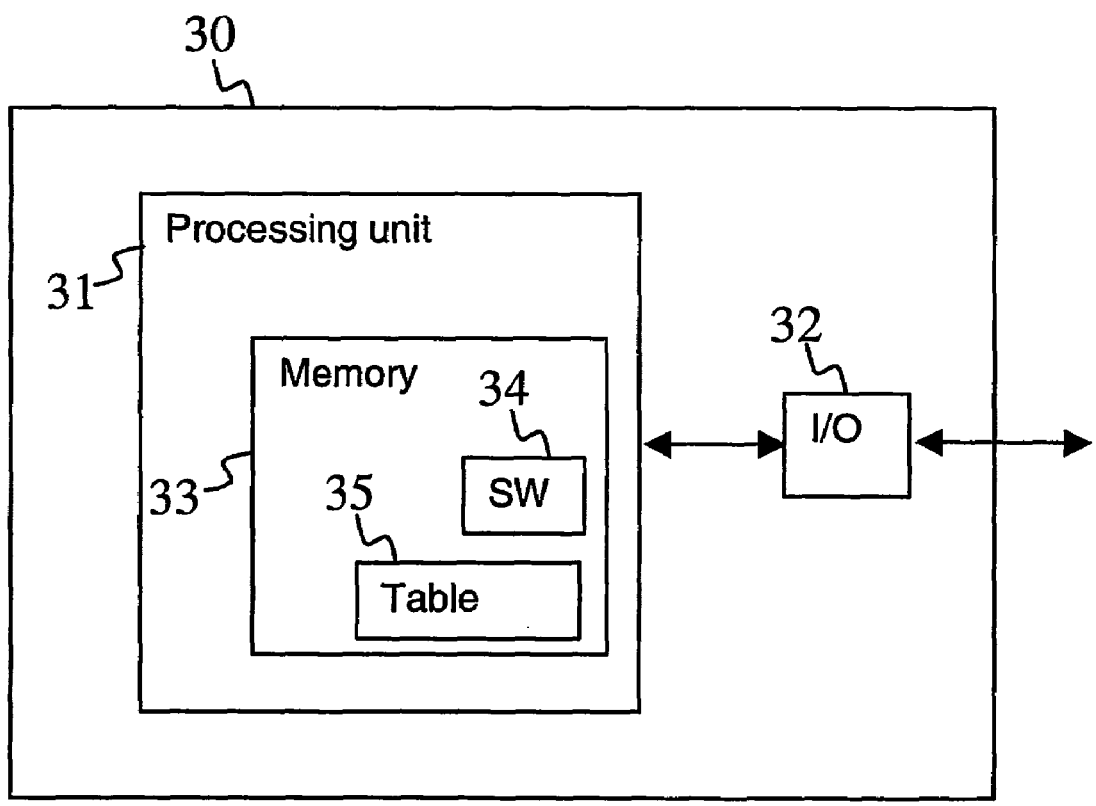
FIG. 2 shows a table of differences between temperatures of a humidity sensor and the environment according to an embodiment of the invention.
FIG. 3 is a simplified block diagram of a data processing device according to an embodiment of the invention.

FIG. 2 describes a table 20 according to an embodiment of the invention of differences $\Delta T_U$ between the temperatures of humidity sensor and environment (correction values of $T_U$ in relation to the environmental temperature). At day-time the temperature of the humidity sensor is higher than the temperature of air, and at night-time the situation is the opposite.

Said table may be formed, for example, by performing in different environmental conditions comparison measurements on environmental temperature and humidity sensor temperature by means of which one is naturally able to form a table of differences in these temperatures.

Alternatively, one may utilise in forming the table, for example, suitable dew point sensor measurements or atmospheric radar measurements or other suitable methods with which the needed variables may be found out. The temperature difference values needed for the table may be determined also indirectly by measuring and comparing in different environmental conditions humidity with the humidity sensor of the radiosonde and a humidity measuring method which is suitable for comparison and supplies a comparison humidity in which the known error factors of the used sensor are observed. Also the humidity measuring differences of measurements performed at night- and day-time may be used. Then, the values of the table may be deducted based on the differences of humidity measurement results of the radiosonde and actual humidity. This procedure is sensible because the measurement which supplies the actual humidity is typically difficult and/or expensive to perform and thus an uneconomic method to be used in continuous measurements.

The above-described measurements performed with an atmospheric radar (for example, DIAL and RAMAN Lidar) or with dew or frostpoint sensors are generally known in the field of meteorological measurements so they are not discussed here in detail.

In table 20, the environmental conditions vary as a function of air pressure P and solar elevation angle h. The horizontal axis presents air pressure P, and the vertical axis presents solar elevation angle h. The solar elevation angle is in meteorology a generally known variable, which varies as a function of location, date and time, and air pressure is a variable also otherwise typically measured in the radiosonde so the value of $\Delta T_U$ corresponding certain humidity measuring is straightforwardly available in the table.

The cells of the table present some hypothetical values for temperature differences $\Delta T_U$. For example, the solar elevation angle being −7 (the sun is 7° below the horizon, that is, it is night) and air pressure being 1000 hPa, the temperature difference $\Delta T_U$ is typically 0° C. (or little below 0° C. the nightly IR radiation being significant depending on the pressure level). Thus, the sensor may actually be colder than the measured air temperature. Respectively, the temperature difference $\Delta T_U$ corresponding solar elevation angle 90 and air pressure 3 hPa may be, for example, 10° C. Thus, the temperature difference may have clearly changed. The temperature difference, that is, the correction value of $\Delta T_U$ is now to warmer direction in respect of air temperature because solar radiation has warmed the sensor. One must notice that in an actual application the values of the table may naturally deviate from presented values because in the actual application the values of the table are based on measurements performed in environmental conditions in question.

The values presented in the table 20 of FIG. 2 may also be saved to some other suitable data structure, for example, a (linked) list or a vector.

According to an embodiment of the invention, said correction values of the correction table are the correction values of saturation humidity level $\Delta_{rh}$, and error-corrected humidity U is calculated by means of $\Delta U_{rh}$ corresponding at least one current environmental conditions parameter value and measured environmental humidity $U_m$.

The correction value of saturation humidity level $\Delta U_{rh}$ may be determined in the correction table, for example, as a function of saturation humidity $U_{rh}$ dependent on temperature and air pressure P presented, for example, for the solar elevation angle h=90. Then, the final correction of saturation humidity level $\Delta U_{rh}'$ may be calculated in the following way:

$$\Delta U_{rh}' = n \cdot k_U \cdot \Delta U_{rh},$$

in which
$k_U$=ventilation factor in relation to a nominal value,
n=standardised variable varying as a function of solar elevation angle h and air pressure P, and
$\Delta U_{rh}$=correction value of saturation humidity level in current (nominal $k_U$) environmental conditions obtained from the table.

If required, the value of $\Delta U_{rh}$ in question may be corrected, in addition to $k_U$, also in relation with other affecting thermodynamic factors.

Now, the error-corrected humidity U may be calculated by observing the measured humidity level, for example, from the formula:

$$U = U_m + \frac{U_m}{U_{rh} - \Delta U_{rh}'} \Delta U_{rh}',$$

in which
$U_m$=measured humidity,
$U_{rh}$=saturation humidity level, and
$\Delta U_{rh}'$=final correction of saturation humidity level % rh.

The correction value of saturation humidity level $\Delta U_{rh}$ may be determined in the correction table also as a function of solar elevation angle h and air pressure P. Then, the final correction of saturation humidity level $\Delta U_{rh}'$ may be calculated in the following way:

$$\Delta U_{rh}' = k_U \cdot \Delta U_{rh},$$

in which
$k_U$=ventilation factor in relation to a nominal value, and
$\Delta U_{rh}$=correction value of saturation humidity level in current (nominal kU) environmental conditions obtained from the table.

If required, the value of $\Delta U_{rh}$ in question may be corrected, in addition to $k_U$, also in relation with other affecting thermodynamic factors.

Now, the error-corrected humidity may be calculated, for example, from the formula:

$$U = U_m + \frac{U_m}{U_{rh} - \Delta U_{rh}'} \Delta U_{rh}',$$

in which
$U_m$=measured humidity,
$U_{rh}$=saturation humidity level, and
$\Delta U_{rh}'$=final correction of saturation humidity level % rh.

According to an embodiment of the invention, said correction values of the correction table are directly the correction values of saturation humidity level $\Delta U$ (for example, as percentages of measured environmental humidity $U_m$), in which case the error-corrected humidity U is calculated by means of $\Delta U$ corresponding at least one current environmental conditions parameter value and measured environmental humidity $U_m$.

The correction value of humidity level $\Delta U$ may be determined in the correction table, for example, as a function of air pressure P and solar elevation angle h. Then, the final humidity correction $\Delta U'$ may be calculated, for example, in the following way:

$$\Delta U' = k_U \cdot \Delta U,$$

in which
$k_U$=ventilation factor in relation to a nominal value, and
$\Delta U$=humidity level correction value in percentages in current (nominal $k_U$) environmental conditions obtained from the table.

If required, the value of $\Delta U$ in question may be corrected, in addition to $k_U$, also in relation with other affecting thermodynamic factors.

Now, the error-corrected humidity may be calculated, for example, from the formula:

$$U = U_m + \Delta U' \cdot \frac{U_m}{100},$$

in which
$U_m$=measured humidity, and
$\Delta U'$=final humidity correction in percentages.

FIG. 3 is simplified block diagram of a data processing device 30 according to an embodiment of the invention which data processing device may be, for example, a general-purpose computer or server or included in a radiosonde.

The data processing device 30 comprises a processing unit 31 and an I/O interface 32 connected to it, via which interface the data processing device communicates with other devices through either a fixed line or wireless data transmission connection, via which data may be input to the data processing device and via which the data processing device outputs data. The I/O interface comprises typically a user interface (UI, not shown in the figure) comprising, for example, a display and a keyboard and possibly some other control device (not shown in the figure) by means of which the data processing device in question may be used.

The invention may also be utilised in devices, which do not have an actual user interface, such as in a radiosonde.

The processing unit 31 comprises a processor (not shown in the figure), a memory 33 and a computer program 34 stored into the memory to be run in said processor. According to the computer program 34, the processor controls the data processing device to produce a routine for correcting the humidity measurement results of the radiosonde, especially in respect to errors resulting from radiative heat exchange.

The data processing device is controlled to receive the humidity $U_m$ measured with the humidity sensor and a current value of at least one environmental conditions parameter. The data processing device may comprise a radio receiver for receiving the measurement results of the radiosonde directly from the radiosonde or the measurement results may be input to the data processing device with another suitable way via I/O interface 32. Furthermore, the data processing device is controlled to calculate the error-corrected humidity U directly or indirectly by means of measured environmental humidity $U_m$ and received at least one current environmental conditions parameter value.

In an embodiment of the invention, to the memory 33 is furthermore stored a beforehand formed table 35, which comprises correction values of humidity measurement results in different environmental conditions, the environmental conditions being determined as a function of at least one environmental conditions parameter. Then, the computer program 34 controls the processor to calculate error-corrected humidity U directly or indirectly by means of measured environmental humidity $U_m$ and a correction value mentioned in table 35 corresponding at least one environmental conditions parameter.

In an alternative application of the invention, the computer program 34 controls the processor to calculate a correction value of humidity measurement result corresponding received at least one current environmental conditions parameter value by means of a beforehand determined mathematical function and to use the calculated correction value in calculating error-corrected humidity U.

According to further embodiment of the invention, the data processing device is controlled to receive the environmental temperature $T_T$ measured with the temperature sensor in the radiosonde. Furthermore, the data processing device is controlled to calculate humidity sensor temperature $T_U$ by means of environmental temperature $T_T$ and table 35, said table comprising differences $\Delta T_U$ between environmental temperature and humidity sensor temperature in different environmental conditions and to calculate the error-corrected humidity U by means of humidity sensor temperature $T_U$, environmental temperature $T_T$ and measured humidity $U_m$.

The details of the invention were described above by way of examples in connection with advantageous embodiments without limiting the invention to these examples only. It is clear to those skilled in the art that this invention is not limited to the details described here, and that the invention may be implemented in another way without deviating from the characteristic features of the invention. The implementation and utilising possibilities of the invention are limited solely by the appended patent claims. Thus the different implementation alternatives of the invention defined by the claims, also equivalent implementations, are within the scope of the invention.

The invention claimed is:

1. A method for correcting humidity measurement results of a radiosonde in respect to errors resulting from radiative heat exchange, the radiosonde comprising at least a humidity sensor and a temperature sensor, the method comprising:
   determining correction values for humidity measurement results in different environmental conditions, said correction values being organized in a beforehand formed data structure or calculated utilizing a beforehand determined mathematical function, said environmental conditions being determined as a function of at least one environmental conditions parameter, said environmental conditions parameter being a variable having an effect in the environment of the humidity sensor and said correction values being determined so that they correct errors resulting from radiative heat exchange,
   measuring environmental humidity $U_m$ with said humidity sensor,
   determining a current value of at least one environmental conditions parameter,
   measuring the environmental temperature $T_T$ with said temperature sensor,
   calculating humidity sensor temperature $T_U$, utilizing said measured environmental temperature $T_T$ and said correction values, which are differences $\Delta T_U$ between the measured environmental temperature $T_T$ and the humidity sensor temperature $T_U$ and correspond to the determined current value of said at least one environmental conditions parameter, and
   calculating error-corrected humidity U utilizing the calculated humidity sensor temperature $T_U$, the measured environmental temperature $T_T$ and the measured environmental humidity $U_m$.

2. The method according to claim 1, wherein said environmental conditions parameter relates to at least one variable affecting the humidity measurement result.

3. The method according to claim 1, wherein said differences $\Delta T_U$ between the environmental temperature $T_T$ and the humidity sensor temperature $T_U$ are determined based on comparison measurements.

4. The method according to claim 1, wherein said differences $\Delta T_U$ between the environmental temperature $T_T$ and the humidity sensor temperature $T_U$ are determined as a function of air pressure P and solar elevation angle h.

5. The method according to claim 1, wherein said differences $\Delta T_U$ between the environmental temperature $T_T$ and the humidity sensor temperature $T_U$ are determined as a function of saturation humidity rh dependent on temperature and of air pressure P.

6. The method according to claim 1, further comprising:
error-correcting the measured environmental temperature $T_T$ before calculating the humidity sensor temperature $T_U$, and
using the error-corrected environmental temperature $T_T$ in calculating the humidity sensor temperature $T_U$ and the error-corrected humidity U.

7. The method according to claim 1, wherein the humidity sensor temperature $T_U$ is calculated in the following way:

$$T_U = T_T + k_U \cdot \Delta T_U,$$

in which
$T_T$=environmental temperature measured with temperature sensor advantageously error-corrected,
$k_U$=ventilation factor in relation to a nominal value, and
$\Delta T_U$=difference between environmental temperature and humidity sensor temperature in current environmental conditions.

8. The method according to claim 1, wherein the error-corrected humidity U is determined in the following way:

$$U = \frac{e(T_T)}{e_w(T_T)} \cdot 100 = \frac{e_w(T_U)}{e_w(T_T)} \cdot U_m,$$

in which
$T_T$=environmental temperature measured with temperature sensor advantageously error-corrected,
$T_U$=humidity sensor temperature,
$U_m$=measured humidity,
$e_w(T_U)$=partial pressure of saturated water vapour in temperature $T_U$,
$e_w(T_T)$=partial pressure of saturated water vapour in temperature $T_T$, and
$e(T_T)$=actual vapour pressure in temperature $T_T$.

9. A data processing device for correcting humidity measurement results of a radiosonde in respect to errors resulting from radiative heat exchange, the radiosonde comprising at least a humidity sensor and a temperature sensor, the data processing device comprising:
a memory comprising correction values for humidity measurement results in different environmental conditions, said correction values being organized in a beforehand formed data structure or calculated utilizing a beforehand determined mathematical function stored in the memory, said environmental conditions being determined as a function of said at least one environmental conditions parameter, said environmental conditions parameter being a variable having an effect in the environment of the humidity sensor and said correction values being determined so that they correct errors resulting from radiative heat exchange,
a receiver configured to receive environmental humidity $U_m$ measured with said humidity sensor and receiving environmental temperature $T_T$ measured with said temperature sensor and receiving the current value of at least one environmental conditions parameter, and
a calculator configured to calculate the humidity sensor temperature $T_U$ utilizing said measured environmental temperature $T_T$ and said correction values, which are differences $\Delta T_U$ between the measured environmental temperature $T_T$ and the humidity sensor temperature $T_U$ and correspond to the current value of said at least one environmental conditions parameter and for calculating error-corrected humidity U utilizing the calculated humidity sensor temperature $T_U$, the measured environmental temperature $T_T$ and the measured environmental humidity $U_m$.

10. The data processing device according to claim 9, said data processing device is located in said radiosonde.

11. A computer program product, comprising:
a computer readable medium; and
computer program instructions recorded on the computer readable medium and executable by a processor for carrying our a method for correcting humidity measurement results of a radiosonde in respect to errors resulting from radiative heat exchange, the radiosonde comprising at least a humidity sensor and a temperature sensor, a memory comprising correction values for humidity measurement results in different environmental conditions, said correction values being organized in a beforehand formed data structure or calculated by utilizing a beforehand determined mathematical function stored in the memory, said environmental conditions being determined as a function of at least one environmental conditions parameter, said environmental conditions parameter being a variable having an effect in the environment of the humidity sensor and said correction values being determined so that they correct errors resulting from radiative heat exchange, said method comprising:
receiving environmental humidity $U_m$ measured with said humidity sensor and receiving environmental temperature $T_T$ measured with said temperature sensor and receiving the current value of at least one environmental conditions parameter, and
calculating the humidity sensor temperature $T_U$ utilizing the measured environmental temperature $T_T$ and said correction values, which are differences $\Delta T_U$ between the measured environmental temperature $T_T$ and the humidity sensor temperature $T_U$ and correspond to the current value of said at least one environmental conditions parameter and for calculating error-corrected humidity U by means of the calculated humidity sensor temperature $T_U$, the measured environmental temperature $T_T$ and the measured environmental humidity $U_m$.

12. The method according to claim 2, wherein said at least one variable affecting the humidity measurement result includes pressure, environmental temperature, humidity, location altitude of the radiosonde, sounding time of the radiosonde, intensity of solar radiation, solar elevation angle, location of the radiosonde on the globe or ascending speed of the radiosonde.

* * * * *